July 31, 1962 S. E. MANECKE 3,047,705
THERMOSTATIC CONTROL DEVICE
Filed March 1, 1960
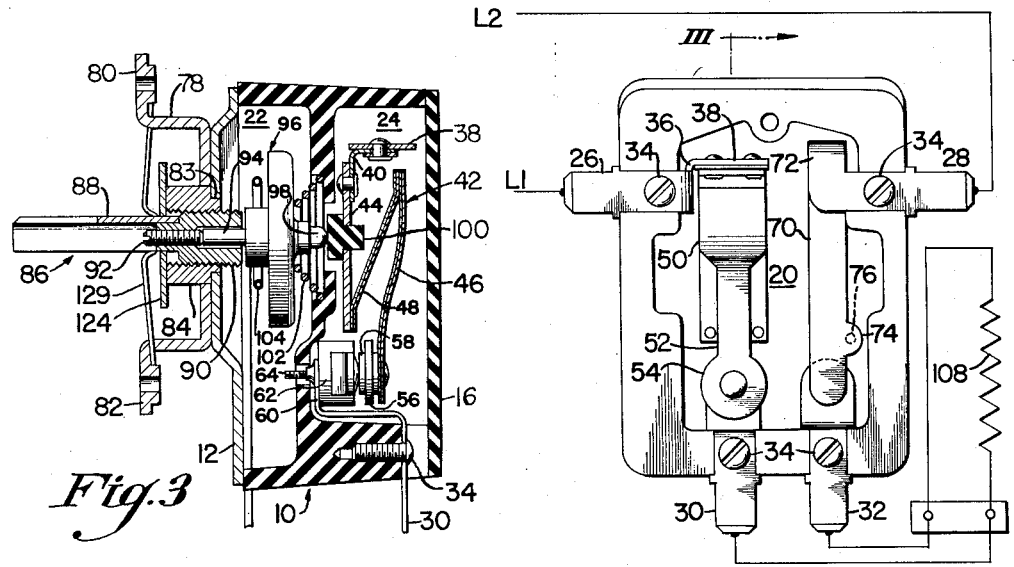
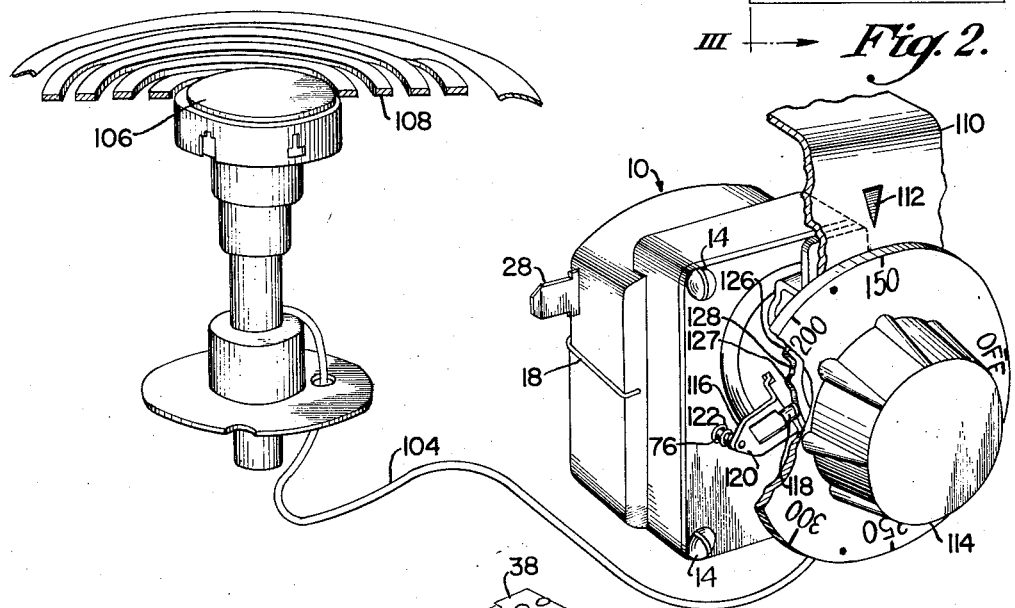
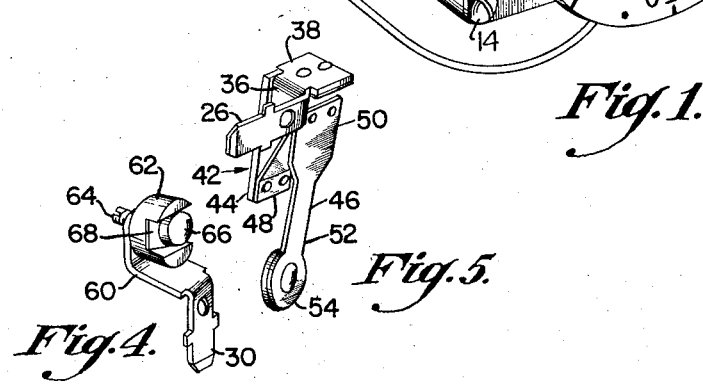

United States Patent Office 3,047,705
Patented July 31, 1962

3,047,705
THERMOSTATIC CONTROL DEVICE
Siegfried E. Manecke, Indiana, Pa., assignor to Robertshaw-Fulton Controls Company, Richmond, Va., a corporation of Delaware
Filed Mar. 1, 1960, Ser. No. 12,025
4 Claims. (Cl. 219—20)

This invention relates to thermostatic control devices and in particular to a thermostatic control device for controlling the flow of electrical energy to the heating means of an electric heating device.

An object of this invention is to anticipate a preselected temperature of an electric heating device.

A further object of this invention is to use a simple and economical construction for a thermostatic switch control.

Another object of this invention is to reduce the temperature overshoot of an electric heating device to a negligible minimum.

This invention has another object in that an electric heating device is continuously energized during an initial heating period and intermittently energized during a subsequent heating period.

This invention has another object in that the current responsive bimetal of a thermostatic switch is movable from a noncycling to a cycling position.

In carrying out this invention, a thermostatic switch is provided with contact means to control the operation of an electric circuit for an electric heating device. The contact means are opened and closed by a switch arm assembly which includes current responsive thermal means and which is movable between a contact closed position and a contact cycling position; such movement is effected by means that anticipate a preselected temperature to be maintained at the heating device.

Other objects and advantages of this invention will become apparent from the following description taken in connection with the accompanying drawings wherein:

FIG. 1 is a perspective view of a device embodying this invention;

FIG. 2 is a rear elevation of the control device of FIG. 1 with the rear cover removed and showing a schematic arrangement of the wiring diagram;

FIG. 3 is a section taken on line III—III of FIG. 2 with the rear cover attached;

FIG. 4 is a perspective view of a detail; and

FIG. 5 is a perspective view of another detail.

It is to be understood that this invention may be utilized for thermostatically controlling various types of energizing circuits for various types of electric heating devices. For example, this invention is particularly applicable for controlling the heating element or elements of electric cooking ranges, such as the oven heating element and the top surface heating element; for the purposes of explanation, the invention will be described in connection with a heating element of the top surface type found on electric cooking ranges.

As is illustrated in FIGS. 1 and 3 of the drawings, a switch casing, indicated generally at 10, is made of any suitable insulating material and is provided with a front cover assembly 12 attached as by screws 14 and a rear cover plate 16 held in place by a U-shaped retaining clip 18, the legs of which resiliently snap over opposite sides of the casing 10. An interior vertical wall 20 is integrally formed in the casing 10 and spaced intermediate the front cover assembly 12 and the rear cover plate 16 to separate the interior of the casing 10 into a front chamber 22 and a rear chamber 24.

The surface defining the rear periphery of the casing 10 presents recessed mountings for two line terminals 26 and 28 and two circuit terminals 30 and 32, which are secured to the casing as by screws 34. The terminal 26 has a first inner portion 36 perpendicularly bent toward the interior wall 20 and a second inner portion 38 perpendicularly extending from the top edge of the first portion 36.

A generally L-shaped resilient hinge member 40 has one leg riveted to the mounting portion 38 and its other leg forming a support for a current carrying switch arm assembly indicated generally at 42. The switch arm assembly 42 has a generally Z-shaped configuration formed by a substantially rigid, flat, rectangular switch arm 44 having one end riveted to the other leg of the resilient hinge member 40, a control bimetal 46 disposed in spaced parallel relationship to the arm 44, and an ambient compensating bimetal 48 forming a connecting strip between the switch arm 44 and the control bimetal 46.

The connecting bimetal 48 is a flat, rectangular strip, the ends of which are oppositely bent to form spaced parallel connecting tabs; one connecting tab is secured as by spot welding to the free end of switch arm 44 and the other connecting tab is similarly secured to an attaching portion 50 of the control bimetal 46. The attaching portion 50 is a substantially rectangular plate which tapers in width to join an intermediate rectangular strip 52 having a width reduced in size from the portion 50 and being integrated with a circular movable end plate 54 that carries a steel slug 56 and a contact 58.

As is illustrated in FIG. 4, the terminal 30 is provided with an L-shaped bracket 60, one leg of which is integrated with and perpendicularly disposed to the inner edge of terminal 30, and the other leg of which is disposed adjacent the interior wall 20. A horseshoe magnet 62 is adjustably secured to the L-shaped bracket 60 by means of a threaded screw 64, the slotted end of which protrudes through an aperture provided in a vertical wall 20. A fixed contact 66 and a bowed leaf spring 68 are fastened between the legs of the horseshoe magnet 62 and cooperate with the movable contact 58 for opening and closing an electric circuit; snap action for such opening and closing is provided by the coaction between the slug 56 and magnet 62.

The terminal 28 is provided with an integral switch arm 70 disposed in rear chamber 24 substantially parallel to the switch arm assembly 42. The arm 70 is an elongated strip having a contact on its free end and an inverted loop 72 on the other end adjacent the terminal 28; the loop 72 provides an inherent bias to the switch arm 70 so that the free end is normally biased to a contact closed position. The contact on arm 70 cooperates with a fixed contact carried on the inner end of the terminal 32. A tab 74 is formed along one edge of the switch arm 70 for actuating this switch arm to a contact open position by means of a plunger 76 which is slidably mounted in a bore extending through the interior wall 20 and which protrudes through a suitable aperture in the cover assembly 12.

A generally U-shaped mounting bracket 78 has its base secured to the exterior of the cover assembly plate 12 by any suitable means, such as rivets, and its leg members are bent perpendicularly outwardly to form attaching ears 80 and 82. The central part of the bracket 78 is a semicircular ring member which partially encircles an aperture 83 in the cover assembly plate 12. An internally left-hand threaded cylindrical bushing 84 extends through the ring member on the bracket 78 and is secured as by welding to the cover assembly plate 12. The inner end of the bushing 84 is reduced in diameter for reception in the cover aperture 83.

Temperature adjusting shaft means, indicated generally at 86, includes an outer hollow stem 88 and an inner hub member 90 secured together for unitary rotation. The hub member 90 has exterior left-hand threads for mounting in the bore of the bushing 84 and is centrally provided with a threaded bore portion adjacent its outer ends and a communicating smooth counterbore adjacent its inner end. A set screw 92 is adjustably disposed in the threaded bore of the hub 90 and operatively engages a positioning shaft 94 disposed therein.

The positioning shaft 94 is integrated with the rear casing of the contractible and expansible power element 96 which may be of any suitable type that is well known in the art. The power element 96 includes an actuating pin 98 which is disposed within an aperture in the vertical wall 20 to engage an actuator button 100 which is formed of insulating material and is rigidly secured to the switch arm 44. A conical helical spring 102 is mounted in compression between a recessed portion of the vertical wall 20 and the casing of the power element 96. One end of a capillary tube 104 communicates with the interior of the power element 96 while its other end communicates with a temperature sensing element 106 suitably positioned to sense the temperature derived from an electric heating device, as for example, the heating coil 108.

In the illustrated embodiment, the control device is mounted on the panel 110 of an electric range, which panel is provided with an idicia reference mark 112. A control dial 114 is mounted on the shaft stem 88 and is provided with temperature setting indicia for cooperation with the reference mark 112.

The power element 96, the capillary tube 104, and the temperature sensing element 106 constitute a closed system filled with an expansible fluid so that a variation of temperature sensed by the element 106 produces a corresponding expansion or contraction of the power element 96. A corresponding movement of the power element actuating pin 98 causes movement toward and away from the switch arm 44 for moving the same.

A plunger actuator 116 is hingedly mounted on the exterior of the cover assembly plate 12; actuator 116 includes a cam follower tab 118 and a projecting lug 120 which overlies the exposed end of plunger 76. A coil spring 122 encircles the exposed end of plunger 76 and engages the lug 120 to normally bias the actuator 116 away from the plunger 76 and its follower tab 118 into engagement with a disc-type cam 124 mounted on the shaft stem 88 for rotation therewith. The cam 124 has a peripherally projecting stop member 126 which defines the limits of rotation of the shaft stem 88 and the dial 114. Adjacent the stop member 126, the cam 124 is enlarged and recessed to form a hump 127 and a rest 128, respectively, both of which comprise the highest rises of the cam 124. The cam 124 is retained in abutting relation against the bushing 84 by means of a leaf spring member 129 having opposite ends attached to the mounting ears 80 and 82 and a deformed central portion bearing against the disc cam 124.

When the dial 114 is in the off position, the cam follower tab 118 is seated in the rest 128 causing the plunger actuator 116 to be moved against the bias of the coil spring 122 and depressing the plunger 76. In its depressed condition, the plunger 76 moves the tab 74 and switch arm 70 away from its contact closed position whereby current through the control device is cut off.

To place the device in operation, the dial 114 is rotated clockwise to any desired temperature setting, for example, 150° F., as illustrated in FIG. 1. The simultaneous rotation of the cam 124 relieves the bias on the plunger 76 and permits the switch arm 70 to move to its normally closed position. Such rotation also causes axial movement of the hub member 90 within the threaded bushing 84 and because left-hand threads are utilized therebetween, the axial displacement of the hub member 90 is outward of the bushing, i.e., to the left as viewed in FIG. 3, causing outward movement of the entire power element 96 under the bias of the coil spring 102.

The actuating pin 98 is now displaced from the actuator button 100 leaving a gap therebetween. The switch arm 44 is now in its normal operating position and since the thermal means comprising the bimetal elements have not yet been flexed due to self-heat, the contact 58 is closed against the fixed contact 66. With such an arrangement, an electrical circuit for the heating coil 108 may be traced as follows: from line L1, through terminal 26, hinge 40, switch arm 44, ambient compensating bimetal 48, control bimetal 46, contact 58, contact 66, terminal 30, heating coil 108, terminal 32, switch arm 70, and terminal 28 to line L2.

As the current flows through the two bimetals 48 and 46, the control bimetal 46 has a tendency to deflect away from the fixed contact 66 due to self-heat and the ambient compensating bimetal 48 has a tendency to deflect towards the fixed contact 66. However, since the cross sectional area of the control bimetal 46 is approximately half that of the ambient compensating bimetal 48, its self-heating effects will be twice that of the compensating bimetal 48 and the net deflection will be in a direction tending to open the contacts 58 and 66. By proper choice of bimetals, this amount of deflection is made equal to a certain portion of the axial displacement of the power element 96 in response to thermostatic action.

For example, the net deflection of the control bimetal 46 and the ambient compensating bimetal 48 is made equal to a movement corresponding to 50° F. of the power element 96. In the example illustrated, the gap separating the actuating pin 98 and the insulating button 100 corresponds to movement of 100° F. of the power element 96 which brings the actuating pin 98 into engagement with the insulating button 100. Thus, the switch arm assembly 42 has no contact opening movement until the temperature is within 50° F. of the temperature setting, when the control bimetal 46 is moved to a contact cycling position. With such an arrangement, there is no cycling of the control bimetal 46 during such initial movement inasmuch as the net deflection of the bimetals 46 and 48 is not sufficient to separate the contact 58 and the fixed contact 66.

However, as soon as the temperature sensed by the sensing element 106 passes 100° F., the expansion of the power element 96 causes movement of the switch arm 44 moving the same to the right about its hinge 40, as viewed in FIG. 3. Upon such movement, the control bimetal 46 will be placed in a cycling position and the contact 58 will be opened from the fixed contact 66 for the first time. After the first opening, the control bimetal will cool rapidly since there is no longer self-heat from the current and the contacts 58 and 66 will close; the current through the bimetal will again cause it to heat and the whole cycle will be repeated. As the temperature sensed by the sensing element 106 approaches the desired setting of 150° F., the on time of the control will be reduced since the power element 96 is also expanding and tending to turn off the control. When the temperature setting of 150° F. is reached, the control bimetal 46 will be cycling in such a manner so as to provide only the amount of wattage which is necessary to keep the sensed temperature at the desired temperature setting.

It should be noted that the anticipation of 50° F. is an arbitrary figure and can be changed to design to suit the particular environment and particular installation.

Inasmuch as numerous modifications and variations may be made in this invention, it is intended that the foregoing description and drawings shall be interpreted in an illustrative rather than a limiting sense.

I claim:

1. A control device adapted to be connected in an electric circuit to control energization of an electric heating unit; said device comprising an on-off switch connected in said circuit to energize or deenergize said heating unit and having a stationary contact and a movable contact, a bimetallic element thermally responsive to the flow of current therethrough supporting said movable contact for movement into and out of electric contact with said stationary contact, said bimetallic element being adapted to flex in a direction urging said movable contact away from said stationary contact upon heating of said bimetallic element induced by the flow of current therethrough and to flex in a direction urging said movable contact toward said stationary contact upon cooling of said element, temperature responsive means operable to move said bimetallic element in a direction urging said movable contact away from said stationary contact in proportionate response to an increase in temperature adjacent said heating element, and means biasing said movable contact toward said stationary contact with a biasing force at least equal to the maximum current induced flexing force of said bimetallic element whereby said contacts are maintained in engagement with each other until the temperature adjacent said heating element reaches a selected minimum temperature.

2. For use in controlling the energization of an electric heater, a thermostatic control device comprising a casing having a fixed contact therein, a movable contact in said casing, means for interconnecting said contacts in an electric circuit including said heater to energize said heater when said contacts are engaged with each other and to deenergize said heater when said contacts are disengaged with each other, electrically conductive support means in said casing supporting said movable contact for movement relative to said casing toward and away from said fixed contact, said supporting means comprising a support member mounted upon said casing for movement between a normally maintained rest position and an actuated cycling position, a bimetallic assembly adapted to be connected in said circuit to conduct electric current therethrough to said heater when said contacts are closed and mounted upon said support member for movement therewith, means mounting said movable contact on said bimetallic assembly at a location wherein said movable contact is engaged with said fixed contact when said support member is in said rest position, said bimetallic assembly being thermally responsive to the flow of current therethrough when said contacts are engaged to flex from an ambient temperature position in a direction biasing said movable contact away from said fixed contact, means biasing said movable contact toward engagement with said fixed contact with a biasing force at least equal to the maximum opposing biasing force exerted by thermally induced flexing of said bimetallic assembly, and means responsive to the temperature adjacent said heating means for shifting said support member from said rest position toward said actuated position in proportionate response to an increase of the temperature adjacent said heater above a selected minimum temperature, said support member being operable upon movement from said rest position to reduce the biasing force exerted by said biasing means by an amount proportional to the displacement of said support member from said rest position to thereby permit the opposing biasing force exerted by thermally induced flexing of said bimetallic assembly to overcome the biasing force exerted by said biasing means to disengage said movable contact from said fixed contact.

3. In a thermostatic control device as defined in claim 2, the further improvement wherein said beans biasing said movable contact into engagement with said fixed contact comprises a magnetic couple magnetically biasing said contacts into engagement with each other.

4. In a thermostatic control device as defined in claim 2, said bimetallic assembly comprising a first bimetallic arm fixedly secured at one end to said support member, a second bimetallic arm fixedly secured at one end to the other end of said first bimetallic arm, said movable contact being mounted on said second bimetallic arm at the other end thereof, the thermally induced biasing action applied by one of said arms to said movable contact being opposed by and exceeded by the thermally induced biasing force applied by the other of said arms to said movable contact, said movable contact being located at a point closer to said one end of said first bimetallic arm than to the other end of said first bimetallic arm.

References Cited in the file of this patent
UNITED STATES PATENTS

| | | |
|---|---|---|
| 1,321,287 | Daly et al. | Nov. 11, 1919 |
| 2,197,230 | Waddell | Apr. 6, 1940 |
| 2,302,603 | Davis et al. | Nov. 17, 1942 |
| 2,549,461 | Haller | Apr. 17, 1951 |
| 2,817,741 | Turner | Dec. 24, 1957 |
| 2,919,337 | Brosseau et al. | Dec. 29, 1959 |